2,992,971
BIOLOGICAL STAINS
Nathan Millman, Somerville, and Roger Edwin Homm, Neshanic, N.J., assignors to Ortho Pharmaceutical Corporation, a corporation of New Jersey
No Drawing. Filed Nov. 29, 1956, Ser. No. 625,002
7 Claims. (Cl. 167—84.5)

The present invention relates to a novel and improved composition for preparing biological stains.

Objects and advantages of the invention will be set forth in part hereinafter and in part will be obvious herefrom, or may be learned by practice with the invention, the same being realized and attained by means of the steps, processes and compositions pointed out in the appended claims.

The invention consists in the novel compositions and improvements herein shown and described.

The present invention has for its object the provision of a novel and improved composition for preparing biological stains which are more convenient to use, are more economical and more easily shipped than stains heretofore used. A further object is the provision of a biological stain or dye composition which avoids disadvantages inherent in the concentrated dry dye as well as in the presently used dye solutions.

Heretofore, biological stains have usually been sold as the concentrated dry dye, or as an alcohol solution of the dye and have been subject to many disadvantages. The alcohol solutions are relatively expensive to package, either in bottles or ampoules, are subject to severe restrictions in shipment and usually cannot be shipped by air-mail or by air-express, and may thus not be quickly available when needed. Concentrated dry dyes are disadvantageous in actual practice due to the difficulty in avoiding scattering of the finely divided dye particles as the dye is weighed or transferred to a flask for preparation of the dye solution or stain. Concentrated dry dyes are also highly disadvantageous as they must be finely ground by mortar and pestle, must be weighed in individual small amounts, are messy to handle and require careful cleaning of the utensils used in grinding, weighing and mixing. Furthermore, they require the use of accurate apparatus for measuring and packing the small quantities into bottles, or other precise measuring apparatus is required where the stain is to be packaged as a liquid. Also much time is required to compound accurately the relatively complex mixtures which are required for certain stains. These and other disadvantages are completely avoided by practice of the present invention.

In general, the composition of the present invention comprises a non-deteriorating solid vehicle, an agent to render the vehicle soluble and the dye or stain, all of which can be formed as a solid mass and may be divided into small standard units which can be packaged in sealed, sterile packages for shipment and may be readied for immediate use merely by adding the mass to the required quantity of solvent, such as water, or an alcohol-water mixture.

The non-deteriorating solid vehicle used in the composition of the present invention is carboxymethylcellulose which is preferably of a viscosity grade having a viscosity of from 25 to 10,000 centipoises per second at 25° C. and at 2% concentration by weight in water solution. Alternatively, methyl cellulose, or in certain instances ethyl cellulose, may be used, preferably of grades having a viscosity of from 25 to 50 cps. although viscosities as high as 4,000 cps. may be used. Enough of the cellulosic derivative is used to form a relatively dilute solution, such as 1% to 5% solution. As an agent for improving the solubility of the vehicle in water or alcohol, or for rendering it more readily soluble, urea is used, or less preferably allantoin, or ethyl carbamate, and either may be used in a quantity of from $\frac{1}{20}$ to two-thirds or even more by weight based on the quantity of cellulosic derivative used. Urea is preferred by reason of its low cost, and also because it has no substantial effect upon the action of the dye or biological stain. In general, the larger the quantity of urea used with respect to the quantity of carboxymethylcellulose, methyl cellulose or ethyl cellulose, the faster the rate at which the cellulosic derivative is dissolved in the solvent, although even one-twentieth part of urea gives sufficiently fast solubility for most purposes. As a dye or stain, any of the conventional biological stains may be used, such as PAP Stain EA36 or EA50, Wright Stain or the other Papanicolaou stains and is generally present in about the same quantity as the carboxymethylcellulose or other cellulosic derivative.

In preparing the composition of the present invention, the carboxymethylcellulose or methyl cellulose, urea and stain are dissolved in water and the resulting solution is then evaporated to form a film, a foam or a mass of fibrous particles. Where ethyl cellulose is to be used, as is satisfactory where the stain is to be made in alcohol solution, the ethyl cellulose, urea and stain are similarly dissolved in ethanol, methanol or an alcohol-water mixed solvent. The mass is then separated into standard quantities, depending upon the amount to be individually packaged, is sterilized and packaged in a dry state in individual packages, such as hermetically sealed impervious envelopes, which may each contain a suitable amount to be dissolved in 25 cc. of water, alcohol or water-alcohol mixture to form a solution of the desired strength for use.

It will be understood that the foregoing general description and the following detailed description as well are exemplary and explanatory but are not restrictive of the present invention.

Referring now in detail to various working examples of the compositions forming the present invention, the following specific examples are given.

*Example 1.*—200 grams of carboxymethylcellulose (25–50 cps. viscosity grade) and 12.5 grams of urea are dissolved in 10 liters of water; 100 grams of Pap Stain EA36 are added and when thoroughly dissolved, the solution is poured onto a polished glass or non-contaminating metal surface, such as a highly polished, chromium-plated metal surface and is evaporated to give a film about 0.001″ thick. When fully dry, the film is sterilized by heat, and cut into small sheets to contain standardized amounts of the stain. Thus, a piece of film about 16 cm. by 25 cm. will contain the approximate amount of stain required to make 100 cc. of a 1% solution of the stain.

*Example 2.*—The same quantities of methyl cellulose (viscosity grade of 4000 cps.) and urea may be used with 100 grams of Wright Stain to form 10 liters of water solution which is then used to form a film 0.010″ in thickness. When dried, only 20 square centimeters of this film will be required to form 50 cc. of a 1% solution of Wright Stain.

*Example 3.*—For greater convenience in handling the material, while avoiding any slower solubility, the composition may be formed into a dried foam. Where foams are to be formed, it is preferable to use a higher concentration and to use methyl or ethyl cellulose, which preferably has a somewhat higher viscosity at elevated temperatures. 500 grams of methyl cellulose (25–50 cps. viscosity grade) and 200 grams of urea are dissolved in 10 liters of water and 500 grams of Pap Stain EA36 are then dissolved in the solution. The solution is then subjected to violent beating to form a foam and the foam is then dried to form a stable dried foam, which is preferably from 0.010" thick to as thick as 0.250", the thickness being a matter of choice. Such a sheet of dried foam may be standardized so that a given area of foam-sheet contains the desired amount of stain for the preparation of a given quantity of solution.

In the formation of the dried foam, the liquid foam is preferably poured onto a polished drying surface heated to a temperature below the boiling point of water and generally to about 200° F. so that a solid film is formed on one side of the foam, thereby giving a better support and strength to the sheet as a whole, enabling it to be cut and handled without excessive breakage.

*Example 4.*—A foam may be similarly prepared using 200 grams of ethyl cellulose and 50 grams of urea with 100 grams of Pap Stain OG6 to make 10 liters of ethanol solution to be foamed.

*Example 5.*—In place of the 12.5 grams of urea, used in Example 1, the same composition may be prepared with 25 grams of allantoin substituted for the urea, and this may then be formed into film having the desired thickness, from 0.001" to 0.010" or more.

*Example 6.*—A composition may comprise 200 grams of methyl cellulose, 100 grams of Wright Stain and 50 grams of ethyl carbamate to form with water 10 liters of solution, which may then be dried to form film from 0.001" to 0.010" or more in thickness.

*Example 7.*—The composition of Example 3 may be extruded through fine orifices and dried to form filaments or fibrous particles which may be gathered into a wooly mass and after being sterilized may be packaged in standardized quantities.

*Example 8.*—The composition of Example 1 may likewise be extruded to form a fibrous mass, as in Example 7.

*Example 9.*—250 grams of methyl cellulose and 250 grams of urea, allantoin or ethyl carbamate were dissolved in 10 liters of water or water-alcohol mixture, and 500 grams of "Stain OG6" were added and stirred until fully dissolved. When dissolved, the mixture was violently beaten until a stiff foam resulted, after which this foam was poured to the desired thickness onto a hot polished surface, the heating being continued, just below the boiling point of water, until the foam was thoroughly dried, thereby forming a dried stable foam of the desired thickness.

*Example 10.*—Methyl and ethyl cellulose are preferred for the formation of foams, as they are more stable during the drying operation, but carboxymethylcellulose (25 to 50 cps.) may be used if desired, although better results will be obtained with carboxymethylcellulose if a foaming agent is added prior to the violent beating. Among the desirable foaming agents are the ionic and non-ionic surface active foaming agents or detergents such as sodium lauryl sulfate and the quaternary ammonium salts which are used in quantities up to 1%. A typical example of this kind comprises, 500 grams of carboxymethylcellulose, 250 grams of urea, allantoin or ethyl carbamate, 10 grams of foaming agent, 500 grams of the desired stain, such as OG6, all dissolved in 10 liters of water and violently beaten until a thick, stiff foam is formed which remains a stable foam as it is dried on a hot plate.

Typical biological stains which have been referred to may be described more in detail as follows. Papanicolaou Stains OG6 and EA36 comprise, for 100 ml.:

OG6—
 Orange G—0.5% solution in 95% alcohol _____ 100 cc.
 Phosphotungstic acid _____ 0.015 gm.
EA36—
 Light Green SF yellowish—0.1% solution in 95% alcohol _____ 45 cc.
 Bismark Brown—0.5% solution in 95% alcohol _____ 10 cc.
 Eosin yellowish (water and alcohol soluble)—0.5% solution in 95% alcohol __ 45 cc.
 Phosphotungstic acid _____ 0.2 gm.
 Lithium carbonate, saturated aqueous solution _____ 1 drop.

EA50 is generally similar to EA36 but contains less Light Green SFY.

The desired quantity of the film, foam or fibrous mass is preferably packaged in an impervious hermetically sealed envelope, such as may be formed by heat-sealing together two sheets of thermoplastic foil, such as polyethylene film.

For use, the envelope need only be opened and the contained film, foam or fibrous mass dissolved in the indicated quantity of water, alcohol or water-alcohol mixture to form a standardized solution of the stain, ready for immediate use.

The following additional examples (each based on 100 g. water solution) are typical of other compositions within the present invention:

| Example No. | CMC, MC or EC, g. | Ureide, g. | Stain, g. | Film or Foam |
|---|---|---|---|---|
| 11 | CMC, 0.5 | Urea, 0.125 | Pap OG6 1g | Film. |
| 12 | MC, 1.0 | Urea, 0.2 | Wright, 1 | Do. |
| 13 | EC, 2.0 | Urea, 0.5 | ___do___ | Do. |
| 14 | CMC, 2.0 | Urea, 1.0 | Pap EA36, 1 | Do. |
| 15 | MC, 2.0 | ___do___ | Pap EA50, 1 | Foam. |
| 16 | MC, 2.0 | ___do___ | Pap EA36, 1 | Fibre. |
| 17 | MC, 5.0 | Urea, 0.2 | Wright, 1 | Foam. |
| 18 | CMC, 5.0 | Urea, 0.5 | ___do___ | Fibre. |
| 19 | CMC, 5.0 | Allantoin, 1 | ___do___ | Foam. |
| 20 | EC, 5.0 | Allantoin, 5 | Pap EA36, 1 | Do. |
| 21 | MC, 5.0 | Urea, 5.0 | Pap EA50, 1 | Do. |

Note.—CMC is carboxymethylcellulose, MC is methyl cellulose, and EC is ethyl cellulose.

Usually, the films in their dried form will be thinner than the dried foams, films usually being from 0.001" to 0.010" in thickness, while the foamed sheets are usually from 0.010" to 0.250" in thickness. Fibres will usually vary from 0.001" to 0.010" in diameter. Also, in general, the solutions from which films are formed will comprise from 0.5% to 5.0% of carboxymethylcellulose, while foams and fibres will be formed from solutions which comprise from 2.0% to 12.0% methyl or ethyl cellulose. On the same basis, from 0.125% urea, ethyl carbamate or allantoin will be used up to a maximum of about 0.5% with films and fibres and from 0.125% up to a maximum of 5.0% with foams. The concentration of the dye or stain may also vary from about 0.5% to about 3.0% in the solution from which the films, foams or fibres are to be formed, although the amount of the dye or stain will be largely determined by the particular dye or stain being used.

In all of the solid masses in accordance with the present invention, the urea, allantoin or ethyl carbamate is homogeneously dispersed throughout the dried mass of cellulose derivative, and the effective higher limit of the ureide present in the dried mass is the maximum amount which can be contained within the mass without precipitating the cellulose derivative out of the solution from which the solid solution is prepared. Thus, larger amounts can be tolerated in foams, than in films. The biological stain is also uniformly distributed throughout the dried mass, in which is uniformly deposited as the foam, film or filaments are dried.

While the sheet-like film material, the dried foam or mass of dried filaments are generally and preferably packaged in that condition, to insure greater ease of handling as the user prepares the stain solution from them, the solid mass of material may be comminuted to reduce it to whatever size of particles is desired.

The invention in its broader aspects is not limited to the specific steps, process and compositions shown and described but departures may be made therefrom within the scope of the accompanying claims without departing from the principles of the invention and without sacrificing its chief advantages.

What is claimed is:

1. A solid mass soluble in a solvent selected from the group consisting of water, methanol, ethanol, and mixtures thereof and suitable for the ready preparation of standardized biological stain solutions comprising a cellulosic derivative selected from the group consisting of carboxymethylcellulose, methyl cellulose and ethyl cellulose, a compound for improving the solubility of the cellulosic derivative selected from the group consisting of urea, allantoin and ethyl carbamate, and a biological stain distributed in the mass, the solubility-improving compound being present in an amount equal to one-twentieth to two-thirds the weight of the cellulose derivative.

2. A solid mass for the ready preparation of standardized biological stains as claimed in claim 1 in which the solid mass is in the form of a sheet-like film.

3. A solid mass for the ready preparation of standardized biological stains as claimed in claim 1 in which the solid mass is in the form of a dried foam.

4. A solid mass for the ready preparation of standardized biological stains as claimed in claim 1 in which the solid mass is in the form of a mass of filaments.

5. A solid mass for the ready preparation of standardized biological stains as claimed in claim 2 in which the cellulosic derivative is carboxymethylcellulose.

6. A solid mass for the ready preparation of standardized biological stains as claimed in claim 3 in which the cellulosic derivative is methyl cellulose.

7. A solid mass for the ready preparation of standardized biological stains as claimed in claim 3 in which the cellulosic derivative is ethyl cellulose.

References Cited in the file of this patent

UNITED STATES PATENTS

| | | |
|---|---|---|
| 1,659,131 | Bishop | Feb. 14, 1928 |
| 1,979,469 | Johnson | Nov. 6, 1934 |
| 2,032,890 | Schoeller | Mar. 3, 1936 |
| 2,374,544 | Hoyt | Apr. 24, 1945 |
| 2,581,523 | Ferrari | Jan. 9, 1952 |
| 2,602,042 | Abbott | July 1, 1952 |

OTHER REFERENCES

Lesser: Drug and Cosmetic Ind., June 1948, pp. 750–752, 830–832.

Schwartz: Surface Active Agents, vol. I, Intersci. Pub., N.Y., 1949, pp. 234, 235.

Gregory: Uses and Applications of Chemicals and Related Materials, Reinhold Pub. Corp., N.Y., vol. 1, 1939, pp. 629–631.

Squibb Abstract Bulletin, Sept. 20, 1950, p. A1208.

Diserens: Chemical Technology of Dying and Printing, Reinhold Pub. Co., N.Y., 1948, vol. 1, pp. 8, 9.

Worden: Tech. of Cellulose Ethers, pub. by Worden Laboratory and Library, Millburn, N.J., 1933, vol. 1, pp. 102, 186; vol. 4, pp. 1841, 2210–2214, 2217.